(12) United States Patent
Avestruz et al.

(10) Patent No.: US 10,734,844 B2
(45) Date of Patent: Aug. 4, 2020

(54) SWITCHED RECEIVER FOR WIRELESS POWER TRANSFER

(71) Applicants: Al-Thaddeus Avestruz, Ann Arbor, MI (US); Akshay Sarin, Ann Arbor, MI (US)

(72) Inventors: Al-Thaddeus Avestruz, Ann Arbor, MI (US); Akshay Sarin, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 179 days.

(21) Appl. No.: 16/027,994

(22) Filed: Jul. 5, 2018

(65) Prior Publication Data

US 2019/0013699 A1    Jan. 10, 2019

Related U.S. Application Data

(60) Provisional application No. 62/528,905, filed on Jul. 5, 2017.

(51) Int. Cl.
| | |
|---|---|
| H02J 50/12 | (2016.01) |
| H04B 5/00 | (2006.01) |
| H02J 50/80 | (2016.01) |
| H02J 50/10 | (2016.01) |
| H02J 7/00 | (2006.01) |
| H02J 50/05 | (2016.01) |
| H02J 7/02 | (2016.01) |

(52) U.S. Cl.
CPC ............ *H02J 50/12* (2016.02); *H02J 7/0068* (2013.01); *H04B 5/0012* (2013.01); *H04B 5/0037* (2013.01); *H04B 5/0075* (2013.01); *H02J 7/025* (2013.01); *H02J 50/05* (2016.02); *H02J 50/10* (2016.02); *H02J 50/80* (2016.02)

(58) Field of Classification Search
CPC .. H02J 50/05; H02J 50/10; H02J 50/12; H02J 50/80; H02J 7/0068; H02J 7/025; H04B 5/0012; H04B 5/0037; H04B 5/0075; H01F 38/14
USPC ........................................................ 307/104
See application file for complete search history.

(56) References Cited

PUBLICATIONS

A.-T. Avestruz, A. H. Chang, and S. B. Leeb, "Quad-switch push-pull(qspp) rf amplifier with direct, simultaneous modulation of phase andpulse position for spread-spectrum power applications," in 2015 IEEE Applied Power Electronics Conference and Exposition (APEC). IEEE,2015, pp. 3367-3374.
Avestruz, Al-Thaddeus, Michael D. Rinehart, and Steven B. Leeb. "Optimization of spread-spectrum MSK sequences and passive, multi-resonant bandpass rectifiers for wireless power transfer with low electromagnetic interference." Control and Modeling for Power Electronics (COMPEL), 2014 IEEE 15th Workshop on. IEEE, 2014.

(Continued)

*Primary Examiner* — Hal Kaplan
(74) *Attorney, Agent, or Firm* — Lempia Summerfield Katz LLC

(57) ABSTRACT

A receiver for wireless power transfer includes a plurality of passive elements including a coupling element configured to capture an incoming spread spectrum signal, an active switch coupled to the plurality of passive elements, and a controller to generate a control signal for the active switch. The control signal changes a state of the active switch to vary a resonance condition established by the plurality of passive elements.

23 Claims, 9 Drawing Sheets

(56) References Cited

PUBLICATIONS

B. Gulbahar, "Network Topology Modulation for Energy and Data Transmission in Internet of Magneto-Inductive Things," 2016 IEEE Globecom Workshops (GC Wkshps), Washington, DC, 2016, pp. 1-6.

C. Zhang, D. Lin and S. Y. R. Hu, "Efficiency optimization method of inductive coupling wireless power transfer system with multiple transmitters and single receiver," 2016 IEEE Energy Conversion Congress and Exposition (ECCE), Milwaukee, WI, 2016, pp. 1-6.

D. Ahn and S. Hong, "Effect of coupling between multiple transmittersor multiple receivers on wireless power transfer," IEEE Transactions on Industrial Electronics, vol. 60, No. 7, pp. 2602-2613, 2013.

G. Monti, Q. Wang, W. Che, A. Costanzo, F. Mastri and M. Mongiardo, "Maximum wireless power transfer for multiple transmitters and receivers," 2016 IEEE MTT-S International Conference on Numerical Electromagnetic and Multiphysics Modeling and Optimization (NEMO), Beijing, 2016, pp. 1-3.

K. Han and K. Huang, "Wirelessly Powered Backscatter Communication Networks: Modeling, Coverage, and Capacity," in IEEE Transactions on Wireless Communications, vol. 16, No. 4, pp. 2548-2561, Apr. 2017.

Kim, Hongseok, et al. "EMI reduction in wireless power transfer system using spread spectrum frequency dithering." Wireless Power Transfer Conference (WPTC), 2016 IEEE. IEEE, 2016.

Kim, Jonghoon, et al. "Spread spectrum technology to reduce the EMI from the constant voltage source type wireless power transfer system." International Symposium on Antennas and Propagation. 2011.

Nadakuduti, Jagadish, Lin Lu, and Paul Guckian. "Operating frequency selection for loosely coupled wireless power transfer systems with respect to RF emissions and RF exposure requirements." Wireless Power Transfer (WPT), 2013 IEEE. IEEE, 2013.

S. Sasaki and K. Tanaka, "Wireless power transmission technologies for solar power satellite," 2011 IEEE MTT-S International Microwave Workshop Series on Innovative Wireless Power Transmission: Technologies, Systems, and Applications, Uji, Kyoto, 2011, pp. 3-6.

Z. Zhang, K. T. Chau, C. Qiu and C. Liu, "Energy Encryption for Wireless Power Transfer," in IEEE Transactions on Power Electronics, vol. 30, No. 9, pp. 5237-5246, Sep. 2015.

SWITCHED RECEIVER FOR WIRELESS POWER TRANSFER

CROSS-REFERENCE TO RELATED APPLICATION

This application claims the benefit of U.S. provisional application entitled "Switched Receiver for Wireless Power Transfer," filed Jul. 5, 2017, and assigned Ser. No. 62/528,905, the entire disclosure of which is hereby expressly incorporated by reference.

BACKGROUND OF THE DISCLOSURE

Field of the Disclosure

The disclosure relates generally to wireless power transfer.

Background

Wireless power transfer is burgeoning because of convenience, durability, and in many cases, necessity. Contemporary applications include the charging of portable consumer electronics, biomedical implants, and electric vehicle charging. The advent of the Internet of Things (IoT) has unlocked a world of massively interconnected devices with challenges that draw a considerable amount of research towards architectures in and scalability of wireless communications. However, a research gap is widening in scalable wireless power transfer to support these new architectures. Conventional wireless power transfer is intrinsically one-to-one because multiple transmitters and receivers operating at the same frequency in the same physical space with few exceptions mutually couple and interfere with each other. Architectures having multiple transmitters and multiple receivers for wireless power transfer have not yet approached scaling to possibly thousands of devices.

The proliferation of wireless power transfer is also raising challenges in cybersecurity. For example, conventional single-frequency wireless power transfer is vulnerable to an attacker with a powerful transmitter whose goal is to overwhelm or eviscerate a receiver. Another vulnerability is communications that may be embedded in wireless power transfer. A chaotic variation in frequency has been used to make wireless power transfer secure. However, frequency hopping over a small discrete set of frequencies is still vulnerable to attack by multiple transmitters from a determined aggressor.

Additional concerns motivate wireless power transfer to extend beyond the single frequency transfer of power. Regulatory restrictions require wireless power to reside within a narrow frequency band, which carries a number of consequences. The granularity of the frequency bands render frequency optimization for the wide range of wireless power transfer applications difficult. Single frequency operation also limits the bandwidth for communication. For example, at 6.78 MHz frequency operation, the allowed bandwidth is only 30 kHz. Narrow bandwidths impose tight tolerances on resonant components translating to 0.9% for inductors and capacitors at 6.78 MHz, driving cost and complexity to stave off reductions in performance. This also makes the power transfer less tolerant to changes in transfer distances and orientation because of the accompanying variation in magnetic coupling coefficient with the associated alteration of inductances. Several methods have been explored to operate outside of ISM bands, including frequency modulation, random modulation, pulse position modulation, and spread spectrum frequency dithering.

Direct-sequence spread-spectrum wireless power transfer (DSSS-WPT) endeavors to operate optimally across a wide band of frequencies using different codes to circumvent many of the single-frequency limitations. DSSS-WPT allows non-interfering multiple transmitters and multiple receivers while being largely immune to attacks. The modulation provided by DSSS-WPT offers a wider bandwidth for communications embedded in wireless power transfer.

SUMMARY OF THE DISCLOSURE

In accordance with one aspect of the disclosure, a receiver for wireless power transfer includes a plurality of passive elements including a coupling element configured to capture an incoming spread spectrum signal, an active switch coupled to the plurality of passive elements; and a controller to generate a control signal for the active switch. The control signal changes a state of the active switch to vary a resonance condition established by the plurality of passive elements.

In another aspect, a method for wireless power transfer includes obtaining, by a controller of a receiver, pattern data for an incoming spread spectrum signal, determining, by the controller of the receiver, a pattern for the incoming spread spectrum signal based on the obtained pattern data, detecting a polarity of a voltage in the receiver, and generating switch control signals for a plurality of switches of the receiver in accordance with the determined pattern and the detected voltage such that the plurality of switches vary a resonance condition of the receiver.

In yet another aspect, a system for wireless power transfer includes a transmitter configured to generate a spread spectrum signal, and a receiver configured to receive the spread spectrum signal. The receiver includes a plurality of passive elements comprising a coupling element, the coupling element being configured to capture the incoming spread spectrum signal, an active switch coupled to the plurality of passive elements, and a controller to generate a control signal for the active switch. The control signal changes a state of the active switch to vary a resonance condition established by the plurality of passive elements.

In connection with any one of the aforementioned aspects, the receiver may alternatively or additionally include any combination of one or more of the following aspects or features. The plurality of passive elements include a capacitance and an inductance. The capacitance, the inductance, or both the capacitance and the inductance, are parasitic. The coupling element is one of a plurality of coupling elements configured to capture the incoming spread spectrum signal. The controller includes a microcontroller configured to establish a switching pattern for the control signal. The controller includes a memory in which a data indicative of a switching pattern for the control signal is stored. The controller further includes a clock in communication with the memory such that the switching pattern is clocked out of the memory by a clock signal provided by the clock. The controller is configured to receive pattern data and to determine a switching pattern based on the pattern data. The controller is configured to react to the incoming spread spectrum signal to determine a switch pattern for the control signal. The active switch is one of a plurality of active switches. The plurality of active switches are arranged in a full-bridge topology. The plurality of active switches are arranged in a half-bridge topology. The plurality of active switches are arranged in a push-pull topology. The active switch is gated by a ground-referenced waveform. The plurality of passive elements are arranged for zero voltage switching. The plurality of passive elements are arranged for zero current switching. The plurality of passive elements and the active switch are coupled to one another for piecewise resonance. The incoming spread spectrum signal is non-alternating, and the control signal changes the state of the active switch such that the receiver exhibits an alternating voltage. The incoming spread spectrum signal is non-alternating, and the control signal changes the state of the active switch such that the receiver exhibits a non-alternating voltage. The controller is configured to implement multiple access wireless power transfer. The incoming spread spectrum signal is configured in accordance with code division multiplexing for the wireless power transfer.

BRIEF DESCRIPTION OF THE DRAWING FIGURES

For a more complete understanding of the disclosure, reference should be made to the following detailed description and accompanying drawing figures, in which like reference numerals identify like elements in the figures.

Figure 1:
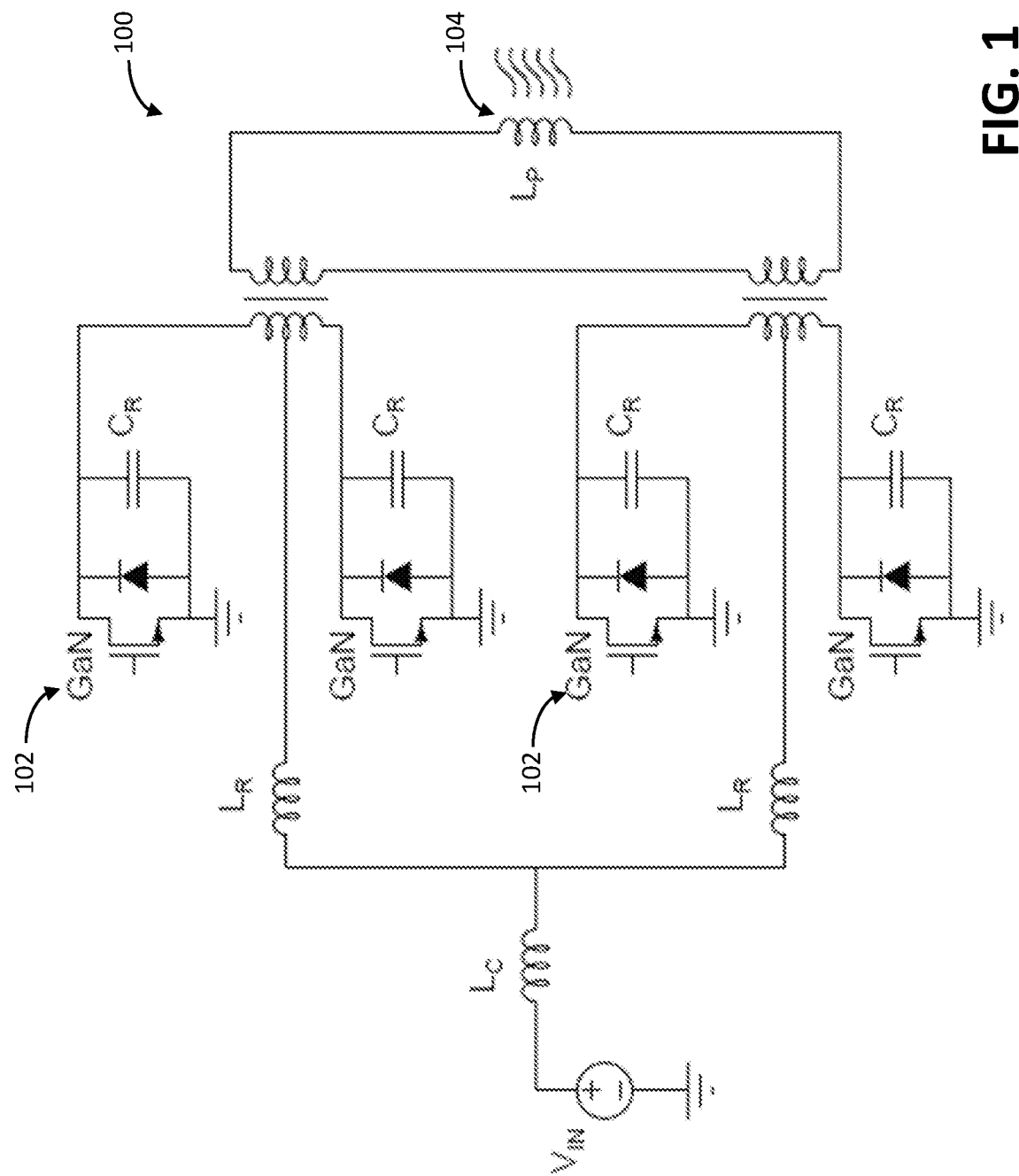
FIG. 1 is a circuit diagram of a broadband transmitter configured for spread spectrum wireless power transfer in accordance with one example.

The disclosed receivers and methods are susceptible of embodiments in various forms. Specific embodiments are illustrated in the drawing and will hereafter be described with the understanding that the disclosure is intended to be illustrative. The disclosure is not intended to limit the invention to the specific embodiments described and illustrated herein.

DETAILED DESCRIPTION OF THE DISCLOSURE

The disclosure relates to switched receivers for wireless power transfer. The switched receivers may be useful in connection with direct-sequence or other spread spectrum wireless power transfer. The receivers may be broadband receivers. The power transfer level and efficiency of the receivers depend on the information that the receiver possesses about the coding and modulation of the power transmission. The receivers may be configured to be robust to disturbances or other interference in the input signal and to small parameter changes. The receivers are also configured to be efficient, and have high power density. The receiver system dynamics may behave homogenously to the input signal, be exponentially stable, and have a convergent trajectory for any initial condition so that open loop operation may be implemented.

The topology of the receiver may vary considerably from the examples described herein. For instance, the receivers are not limited to inductive coupling or charging. Topologies that use capacitive coupling or charging may also be used. In some cases, capacitive coupling or charging may be realized by switching the inductance and capacitance in the circuits described herein. A differential capacitor may then be used. In some cases, an antenna may be used to couple to an electromagnetic wave.

The nature and arrangement of the passive components in the receivers may vary from the examples described herein. For instance, the capacitance(s) and/or the inductance(s) may be parasitic rather than, for instance, provided as discrete components. For example, distributed inductances and capacitances may be provided by a microstrip or other transmission line.

The switched receivers described herein may be implemented in hardware. The receiver hardware may provide a proof-of-principle that confirms approximations used to prove convergence of receiver trajectories, robustness to disturbances in the input signal, and stability in open loop, thereby laying a foundation for a new spread-spectrum wireless power transfer technology.

Various switching patterns may be used with the disclosed receivers. Optimization techniques, such as a greedy optimization method, may used to determine a receiver switching pattern for use with the disclosed receivers. The manner in which the switching pattern is established may vary from the techniques and methods described herein. For instance, the switching pattern may be optimized to maximize efficiency, power transferability, correlation, and/or other characteristics to varying extents. In some cases, the switching pattern may be determined on a portion-by-portion basis.

The receivers described herein are well-suited for use in connection with wireless power transfer for charging electric vehicles. But the disclosed receivers may also be used in other wireless power transfer applications. Power may be wirelessly transferred to a variety of other loads. The nature of the load, power, source, and other characteristics of the environment in which the power transfer occurs may vary considerably. The disclosed receivers may be used in a wide variety of applications, including, for instance, consumer devices, medical implants, and systems having distributed sensors, such as autonomous vehicles.

FIG. 1 depicts a transmitter 100 for spread spectrum wireless power transfer in accordance with one example. The transmitter 100 may be switched and otherwise configured for direct sequence, spread spectrum wireless power transfer, or DSSS-WPT. The transmitter 100 may thus be capable of spreading power across a wideband spectrum, while being power dense and efficient. In this case, the transmitter 100 is configured as a quad-switched push-pull amplifier. Performance is therefore improved relative to conventional class D or class E power amplifiers. Further details regarding the transmitter are presented in Avestruz, et al., "Quad-switch push-pull (QSPP) RF amplifier with direct, simultaneous modulation of phase and pulse position for spread-spectrum power applications," IEEE Applied Power Electronics Conference and Exposition (APEC) (2015), the entire disclosure of which is incorporated by reference.

The transmitter 100 includes a number of switches 102 that are controlled to generate a sequence of waveforms across a coil 104 for wireless transmission. In this example, each switch 102 is or includes a GaN transistor, but alternative or additional transistors or switches may be used. The switches 102 are driven by control signals to generate a power signal having a code or coding sequence or pattern. In some cases, the code sequence includes a sequence of half-sine waves of either positive or negative polarity. For instance, a positive half-sine wave may be representative of a +1. A negative half-sine wave may be representative of a −1. An example code sequence may be 1, 1, −1, 1. Other waveform shapes may be used to represent the codes in the sequence. In some cases, each waveform is separated from adjacent waveforms by a zero voltage interval.

The waveform shapes and zero voltage intervals may be composed of a range of frequencies, i.e., the spread spectrum of the wireless power transfer. In one example, the range or spectrum of frequencies is from about 1 MHz to about 20 MHz. Other frequency ranges or spectrums may be used.

A genetic algorithm to determine example transmitter coding sequences is described in Avestruz, et al., "Optimization of spread-spectrum MSK sequences and passive, multi-resonant bandpass rectifiers for wireless power transfer with low electromagnetic interference," Control and Modeling for Power Electronics (COMPEL), 2014 IEEE 15th Workshop (2014), the entire disclosure of which is incorporated by reference.

A variety of other amplifier topologies may be used for the transmitter 100. The manner in which the coding sequence and transmitter signal are produced may vary considerably.

The receivers described herein are configured to capture the direct sequence, spread spectrum wireless transmission from the transmitter 100. The disclosed receivers are switched receivers in an effort to match the code sequence or pattern of the power signal developed by the transmitter 100. By matching the code sequence, or at least a portion thereof, greater efficiencies may be achieved relative to, for instance, a receiver that merely attempts to use a bandpass filter to capture frequencies within the spread spectrum. Further details regarding the manner in which efficiencies are achieved are set forth below in connection with FIG. 2. By using active switches in the receiver, receiver waveforms may be tailored to match the transmitter waveforms so that power transfer is maximized or adjusted. To improve efficiency, the receiver switches may turn on or off with either or both zero current switching (see, e.g., the example of FIG. 3) or zero voltage switching (see, e.g., the example of FIG. 4).

Figure 2:
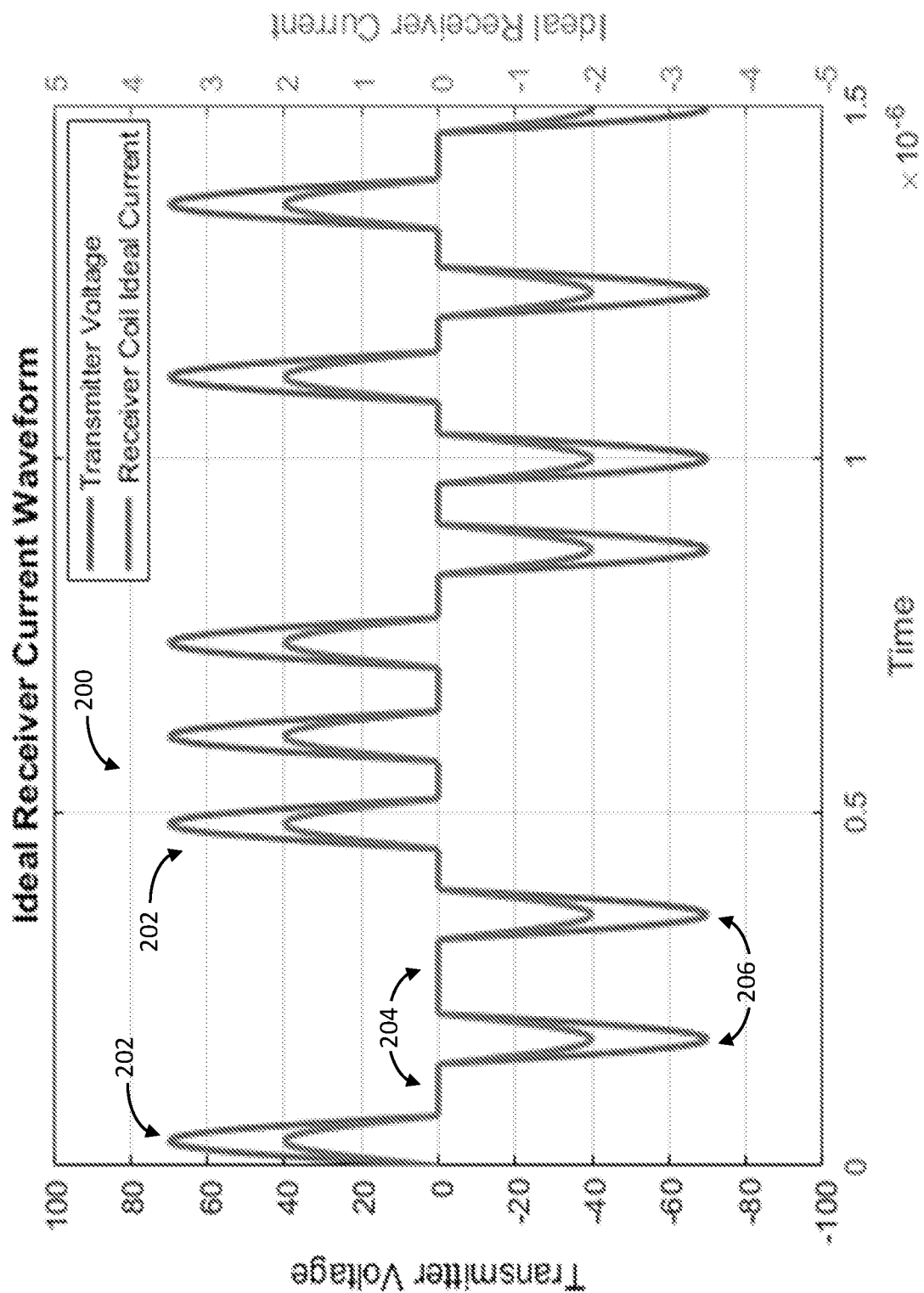
FIG. 2 is a plot of an ideal current waveform for a broadband receiver for spread spectrum wireless power transfer in accordance with one example.

FIG. 2 depicts an ideal receiver current waveform for a given transmitter signal. One goal of a receiver design for DSSS-WPT is to maximize the power received by causing the receiver current waveform to be in phase with the transmitted voltage. Another goal of the receiver is to adjust the power transfer received. The receiver may be designed to achieve alternative or additional goals. With spread spectrum wireless power transfer, the design of receiver is challenging because there are no prevalent frequencies. In fact, the transmitter may be categorized as ultra-wideband (e.g., a bandwidth wider than 20% of the center frequency). For example, the power transmitted by the transmitter 100 of FIG. 1 may be uniformly spread across 1-20 MHz, which precludes the practicality of a strictly passive high-order receiver, leaving the actively switched receivers as a useful option for efficiency.

Ideally, the waveform of the transmitter signal includes a sequence of half-sine waves that are matched in phase and polarity by the receiver current waveform. In the example of FIG. 2, a transmitter signal waveform 200 includes a positive half-sine wave 202, a zero voltage interval 204, two negative half-sine waves 206 separated by another zero voltage interval, then three positive half-sine waves 202 each separated from adjacent waves by a respective zero voltage interval, and so on as shown. As described in the examples below, the spread spectrum receiver uses switches to present a resonant circuit with a variable impedance, e.g., a time varying impedance, such that a resonance condition of the receiver varies. For instance, varying the resonance condition may involve switching different inductances (e.g., inductors) and/or capacitances (e.g., capacitors) into and out of the resonant circuit. Varying the impedance allows the receiver current to be aligned (e.g., in phase) with the portions of the transmitted voltage for maximum power delivery for a given load as shown in FIG. 2.

Figure 3:
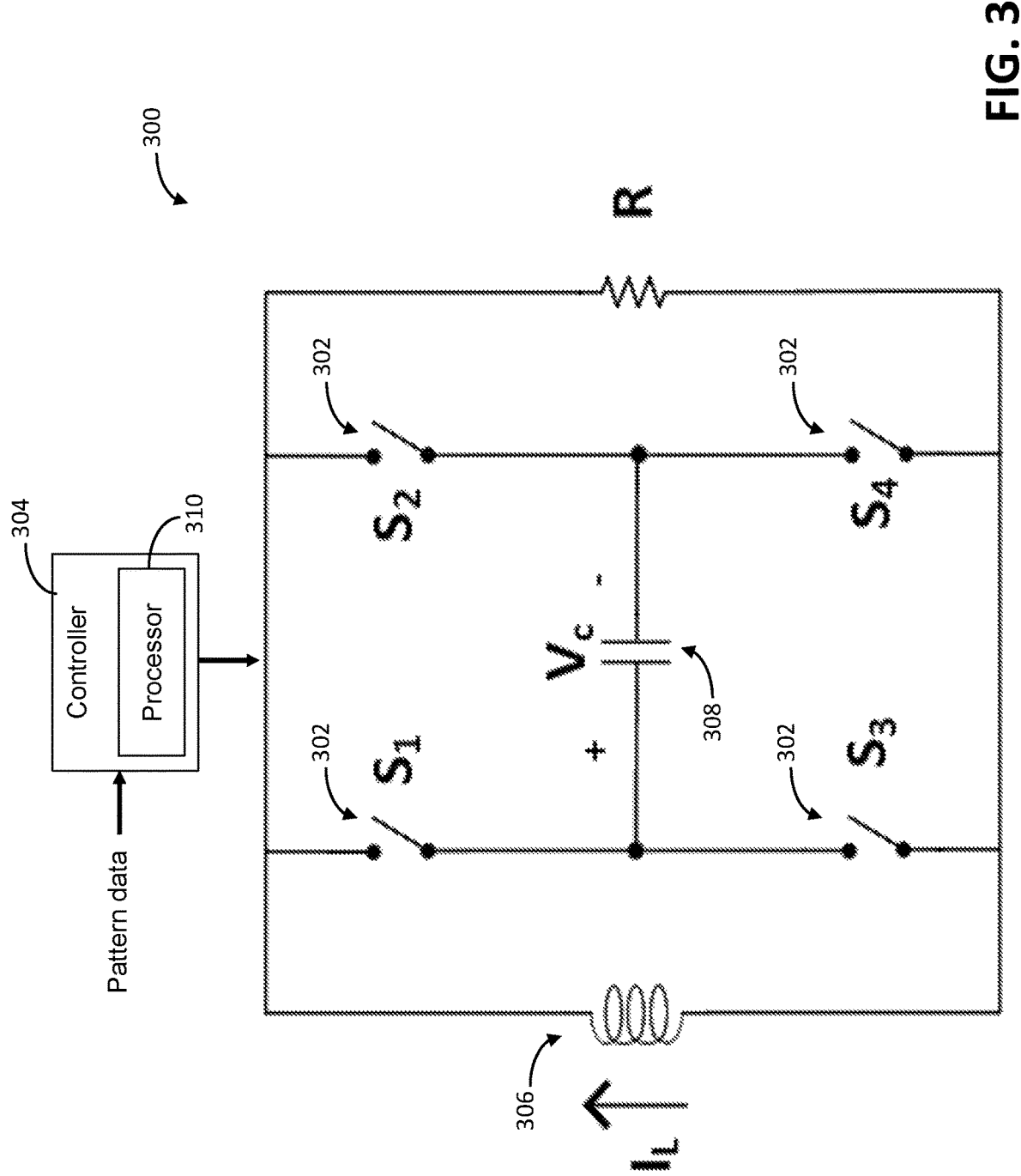
FIG. 3 is a circuit diagram of an active or switched receiver having a full bridge topology for spread spectrum wireless power transfer in accordance with one example.

FIG. 3 depicts a receiver 300 in accordance with an example having a full-bridge active receiver topology. The receiver 300 includes a number of active switches 302 and a controller 304 configured to control the switches 302. In this full-bridge example, four switches S1-S4 are coupled to a plurality of passive elements of the receiver 300. The plurality of passive elements includes a coupling element 306 and a capacitor 308. The coupling element 306 is configured to capture an incoming spread spectrum signal from a transmitter, such as the transmitter 100 of FIG. 1. In this case, the coupling element 306 is or includes a coil or other inductance (e.g., a parasitic inductance). A current $I_L$ through the coupling element is induced by the incoming spread spectrum signal. The capacitor 308 is disposed within the arrangement of the switches 302 in accordance with the full bridge topology.

Each switch 302 may be or include a field effect transistor (FET), such as a GaN FET, or other transistor or active switch. Each switch 302 may have a gate or other control terminal to which a control signal is applied to control the state of the switch 302, i.e., open or closed. The switches 302 are disposed in the full-bridge arrangement across a load R to which the receiver 300 is connected.

The controller 304 generates control signals for the switches 302. Each control signal changes a state of the respective switch 302 to vary a resonance condition established by the plurality of passive elements. The impedance of the resonant tank is thus varied. The control signals may be generated by the controller 304 in accordance with pattern data. The pattern data may be used by the controller 304 to generate the switch control signals. The pattern data may be or include a code sequence, as described above. The pattern data may be indicative of the code (e.g., pulse) sequence. The pattern data may include or be representative of the codes as well as the timing of the codes. In the example of FIG. 3, some or all of the pattern data is provided to the controller 304. In some cases, the pattern data is received from, e.g., a transmitter, such as the transmitter 100 of FIG. 1. For example, the pattern data may be transmitted on a separate channel (e.g., frequency) or as part of the wireless power transmission, as described below. Alternatively or additionally, some or all of the pattern data is provided to the controller 304 by a component of the receiver 300, such as a memory.

In some cases, the controller 304 may determine some or all of the pattern or code sequence from the incoming spread spectrum signal. To that end, the controller 304 may analyze or monitor the current (or voltage) induced by the incoming spread spectrum signal. For instance, the controller 304 may be connected to a node of the receiver 300 through which the current $I_L$ induced by the transmitted voltage flows. In the example of FIG. 3, the controller 304 may be connected to, or otherwise in communication with, a node on either side of the coupling element 306 of the plurality of passive elements. The controller 304 may then sense the current or voltage to detect the polarity of the transmitted voltage.

In the full bridge topology of FIG. 3, the switching pattern is based on the simultaneous detection of the polarities of the transmitted voltage and a voltage $V_c$ across a capacitor 308 or other capacitance (e.g., a parasitic capacitance). When the two voltages have the same sign, either the switches S2, S3 are ON, or the switches S1, S4 are ON, depending on the sign. When the transmitter voltage is 0, either branch of the switches S1, S3 or S2, S4 may be ON. The topology has limitations at high frequencies because of switching loss (being piecewise resonant but not zero voltage switched) and the interest in having high-side gate drives in high voltage applications. However, the topology may be useful in low voltage applications, e.g., those with an on-chip implementation of the receiver 300.

The controller 304 may be or include a field programmable gate array (FPGA) or other processor. In the example of FIG. 3, the controller 304 includes a microcontroller, microprocessor, or other processor 310 to generate the switch control signals. The switch control signals may be arranged to generate half-sine wave current waveforms $I_L$ in the inductor, as described above. The type, components, configuration, and other characteristics of the controller 304 may vary considerably. For instance, a variety of different digital circuits (e.g., digital integrated circuits) and analog circuits (e.g., analog integrated circuits) may be used and configured to establish a switching pattern for the control signal. Mixed-signal integrated circuits may also be used.

In the example of FIG. 3, the pattern data is provided to the controller 304. In some cases, the pattern data is received in real-time, e.g., on a separate or other respective channel. The separate channel may be used alternatively or additionally to provide information to the receiver 300 other than the pattern data. For instance, the information may be indicative of various types of non-idealities, such as transmitter/receiver misalignment or an external source of interference. The information may be used by the controller 304 to customize or otherwise adjust the switching pattern to address the non-idealities. Multiple data paths may thus be used to establish the switching pattern.

Alternatively or additionally, the controller 304 may be configured to analyze the waveform captured by the receiver to establish the switching pattern. The controller 304 may thus be configured to control the switches in a manner reactive to the transferred power.

The full bridge topology may vary from the example of FIG. 3. For instance, in other cases, the coupling element 306 may be configured as an antenna. Alternatively or additionally, the coupling element 306 includes one or more capacitive elements.

The capacitive and inductive elements of the plurality of passive elements may vary from the example of FIG. 3. One or more of the elements may be lumped or distributed elements, or parasitic in nature.

Figure 4:
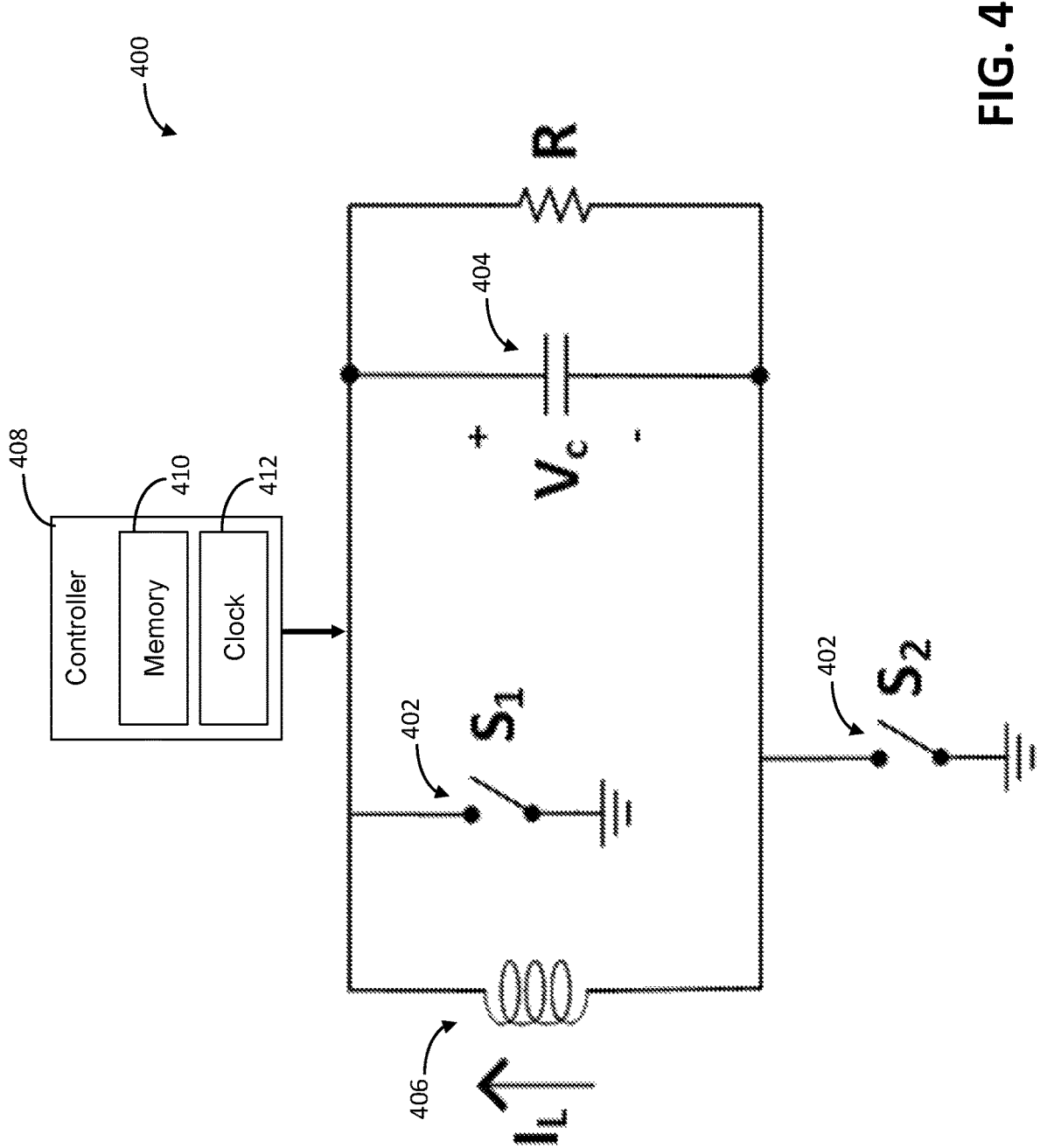
FIG. 4 is a circuit diagram of an active or switched receiver having a push-pull topology for spread spectrum wireless power transfer in accordance with one example.

FIG. 4 illustrates an example of a receiver 400 having a push-pull active receiver topology. The receiver 400 includes a plurality of passive elements and a number of switches 402 coupled to the plurality of passive elements. Unlike the full-bridge topology, the receiver 400 has only ground-referenced switches 402 and is operated at zero voltage switching (ZVS). In this example, the receiver 400 includes two switches S1, S2.

The plurality of passive elements of the receiver 400 includes a capacitor 404 and a coupling element 406. The capacitor 404 is connected across a load R to which the receiver current is provided. The coupling element 406 is configured to capture an incoming spread spectrum signal. In this example, the coupling element 406 is or includes a coil or other inductance.

The receiver 400 has two modes of operation. In the first mode, both switches S1, S2 are ON, with the voltage $V_c$ across the capacitor 404 held at zero. In the second mode, either S1 or S2 is ON depending upon the capacitor polarity. In the second mode, the circuit is a parallel resonant circuit with linear dynamics. The receiver thus is a piecewise linear system, e.g., piecewise resonant.

The receiver of FIG. 4 includes a controller 408 configured to generate the switch control signals. Each control signal changes a state of the respective switch 402 to vary a resonance condition established by the plurality of passive elements. In the example of FIG. 4, the controller 408 includes a memory 410 and a clock 412 such that a clocked memory is used as the control element. The controller 408 may also include one or more processors or processing elements to coordinate or otherwise control the operation of the memory 410 and/or the clock 412. The manner in which the switch control signals are generated may vary from the examples described herein.

The control signals may be generated by the controller 408 in accordance with pattern data. In the example of FIG. 4, some or all of a code sequence or other pattern data is stored in the memory 410. The pattern data may be used by the controller 408 to generate the switch control signals. The pattern data may be or include a code sequence, as described above. The pattern data may be indicative of the code (e.g., pulse) sequence. The pattern data may include or be representative of the codes as well as the timing of the codes.

In the example of FIG. 4, the pattern data is not provided to the controller 304. Instead, the controller 408 is configured to detect or otherwise determine a portion of the code sequence or pattern in the incoming spread spectrum signal. The pattern data stored in the memory 410 and the clock 412 may then be used to predict the remainder of the code sequence. In some cases, the portion of the pattern data is received via a separate channel (e.g., frequency). In other cases, the portion of the pattern data is detected from part of the incoming spread spectrum signal. In still other cases, some or all of the pattern data is provided to the controller 408 in another manner.

The push-pull receiver topology may vary from the example of FIG. 4. For instance, in other cases, the coupling element 406 may be configured as an antenna. Alternatively or additionally, the coupling element 406 includes one or more capacitive elements.

The capacitive and inductive elements of the plurality of passive elements may vary from the example of FIG. 4. One or more of the elements may be lumped or distributed elements, or parasitic in nature.

The controllers of the receivers 300, 400 may vary from the examples shown above. For instance, one or more aspects of the controller 408 (FIG. 4) may be incorporated into the controller 304 (FIG. 3), and vice versa. Other controllers may be used. For instance, in volume applications, the controller may be or include an application specific integrated circuit including a memory block and a correlator for synchronization.

The topology of the receiver may vary from the examples described herein. A variety of different receiver topologies may be used to support wireless power transfer via spread spectrum signals. For instance, the resonant tank of the receiver may have multiple coupling elements.

Figure 5:
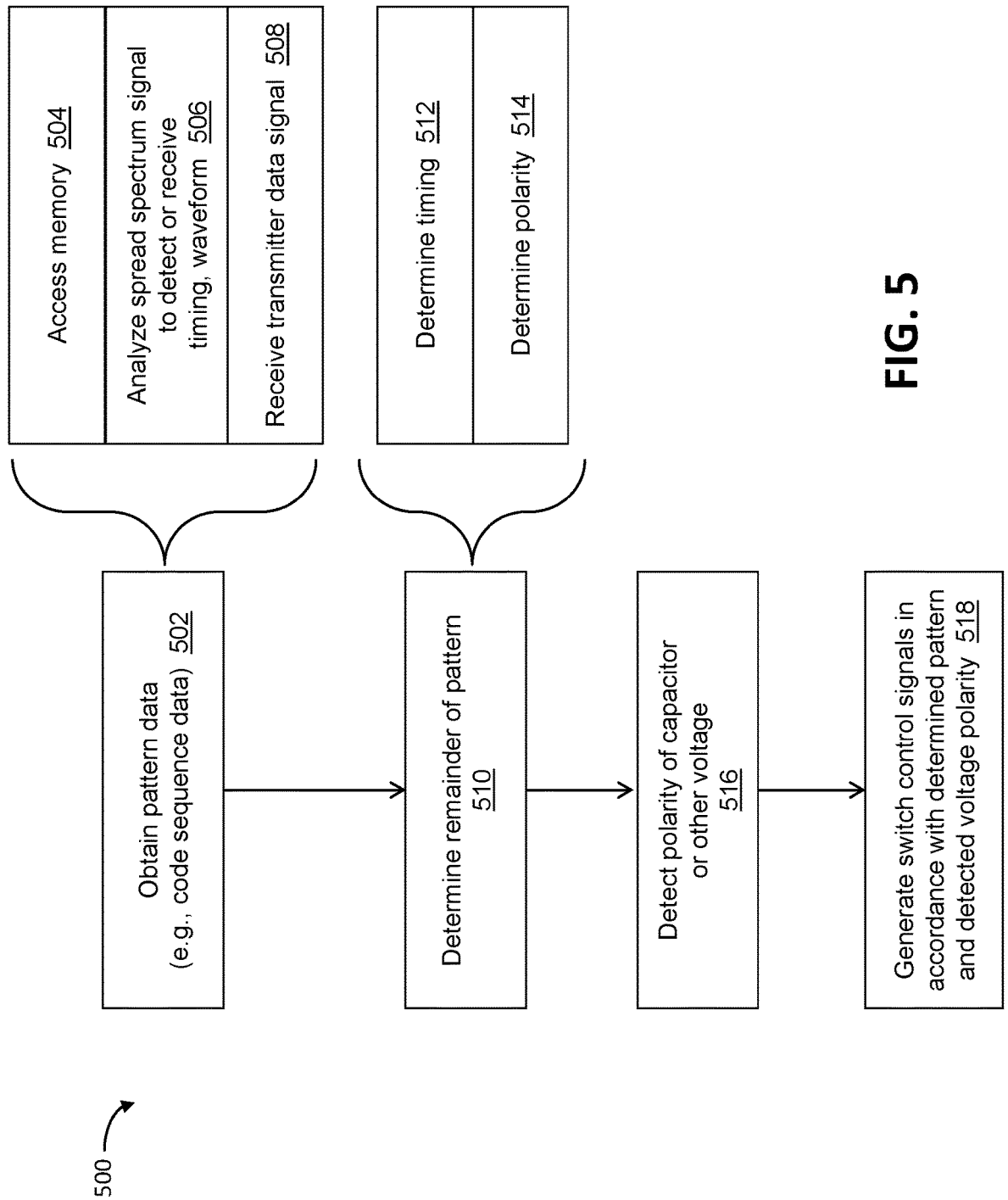
FIG. 5 is a flow diagram of a method of operating an active or switched receiver for spread spectrum wireless power transfer in accordance with one example.

FIG. 5 depicts a method 500 that may be implemented by one of the receivers described herein to generate the switch control signals to support the spread spectrum wireless power transfer. For instance, the method 500 may be implemented by the controller 304 (FIG. 3), the controller 408 (FIG. 4), or another controller. The acts of the method 500 may be implemented in an order other than that shown in FIG. 5. For instance, one or more of the acts may be implemented concurrently. The method 500 may include additional, fewer, or alternative acts. For instance, the method 500 may include one or more acts directed to initiating, coordinating, or otherwise controlling the operation of a clock or other element of the controller.

The method 500 includes an act 502 in which code or pattern data is obtained for an incoming spread spectrum signal. In some cases, the pattern data is obtained by accessing a memory of the controller in an act 504. Alternatively or additionally, the pattern data is obtained by the controller by analyzing the incoming spread spectrum signal in an act 506. The analysis may be directed to detecting a polarity and timing of a waveform of the incoming spread spectrum signal. In still other cases, the pattern data is obtained in an act 508 from a data signal provided to the controller by the transmitter generating the spread spectrum signal. The data signal may or may not be integrated with the spread spectrum signal. For instance, the data signal may or may not be transmitted at a different frequency than the frequency range of the spread spectrum signal. Any combination of these techniques and/or other techniques for obtaining the pattern data may be used.

In an act 510, the controller determines a pattern for the incoming spread spectrum signal based on the obtained pattern data. The pattern data may be indicative of some or all of the code sequence or pattern of the incoming spread spectrum signal. In some cases, the pattern data is only indicative of a portion of the code sequence. The controller may then determine the remainder of the code sequence or pattern from the portion. The determination may be based on data stored in the memory of the controller and/or other information.

The act 510 may include an act 512 in which timing information for the incoming spread spectrum signal is determined. For instance, in half-sine wave examples, the timing information may be indicative of when each half-sine wave begins. The timing information may include data indicative of zero voltage intervals between half-sine waves or other waveforms of the incoming spread spectrum signal. The act 510 may also include an act 514 in which polarity information for the incoming spread spectrum signal is determined.

The method 500 includes an act 516 in which a polarity of a voltage in the receiver is detected. The voltage may be across a capacitor of a resonant tank of the receiver. The resonant tank is provided by a plurality of passive elements as described herein. The nature, configuration, arrangement, and other characteristics of the passive elements may vary. The nature of the detected voltage may thus also vary. For instance, the voltage may be across a capacitance, such as a parasitic capacitance, within the resonant tank. The manner in which the polarity of the voltage is detected may vary.

In an act 518, switch control signals for a plurality of switches of the receiver are generated in accordance with the determined pattern and the detected voltage polarity. The switch control signals are configured such that the plurality of switches vary a resonance condition of the receiver.

The method 500 may include a number of other steps or acts implemented by the controller of the receiver. For instance, acts directed to controlling and using a clock of the controller may be implemented to control a timing of the switch control signals.

Figure 6:
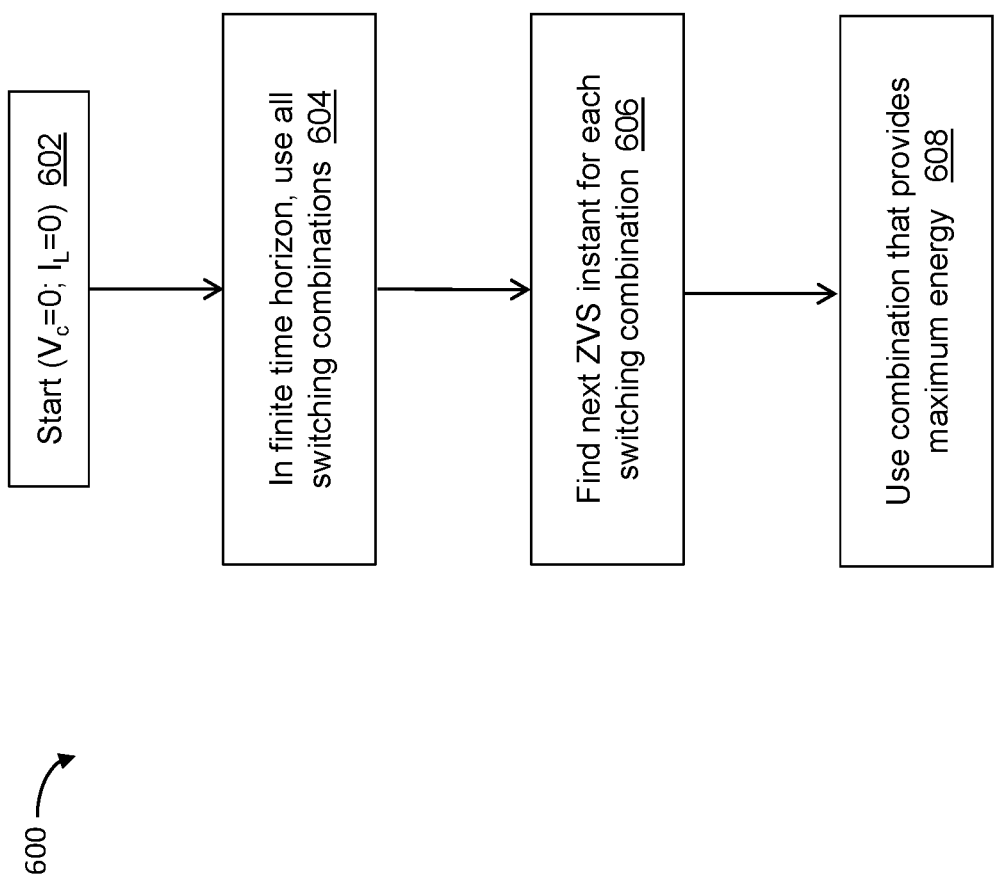
FIG. 6 is a flow diagram of a method for determining a switching pattern for an active or switched receiver, such as the receiver of FIG. 4, in accordance with one example.

FIG. 6 depicts one example of an optimization procedure 600 that may be used to determine a suitable code sequence or pattern for the incoming spread spectrum signal. The procedure may be implemented to configure the controllers described herein prior to operation. In this example, the optimization procedure is configured in accordance with a greedy optimization algorithm or procedure. The greedy optimization algorithm may be useful to determine a switching pattern suitable for the push-pull or other topology of the receivers described herein.

The procedure 600 may begin with an act 602 in which initial conditions are set for the receiver. The initial conditions may include, for instance, a capacitor voltage and the current induced in the coupling element.

The procedure 600 then includes an act 604 in which all switching combinations are used and evaluated. The next zero voltage switching instant for each switching combination is found in an act 606. The combination that maximizes the received energy is then selected in an act 608.

The algorithm is configured to maximize the energy received over one zero voltage switching (ZVS) period for a fixed input pattern. The algorithm takes into account the timing constraints due to the controller (e.g., an FPGA controller) and switch turn-ON/OFF delays. In some cases, the resulting receiver, however, may be under-actuated and hence not able to capture all the power from transmitter spectrum. Alternative or additional optimization methods may be used.

Notwithstanding the above-described procedures, methods, and receivers, the receiver coding sequence may vary relative to the incoming spread spectrum signal. For instance, the incoming spread spectrum signal may be non-alternating, while the control signal changes the state of the active switch such that the receiver exhibits an alternating voltage. Alternatively or additionally, the incoming spread spectrum signal is non-alternating, and the control signal changes the state of the active switch such that the receiver exhibits a non-alternating voltage.

A receiver full-bridge receiver topology optimized with zero voltage switching may be used. However, the physical realization of this topology may involve or include the realization of high-side gate drives for large voltages.

The configuration of the switches in the above-described examples may vary. In some cases, any type of active switch may be used. Each switch may be or include one or more transistor devices. The transistor devices may be semiconductor or other types of transistor devices.

Figure 7:
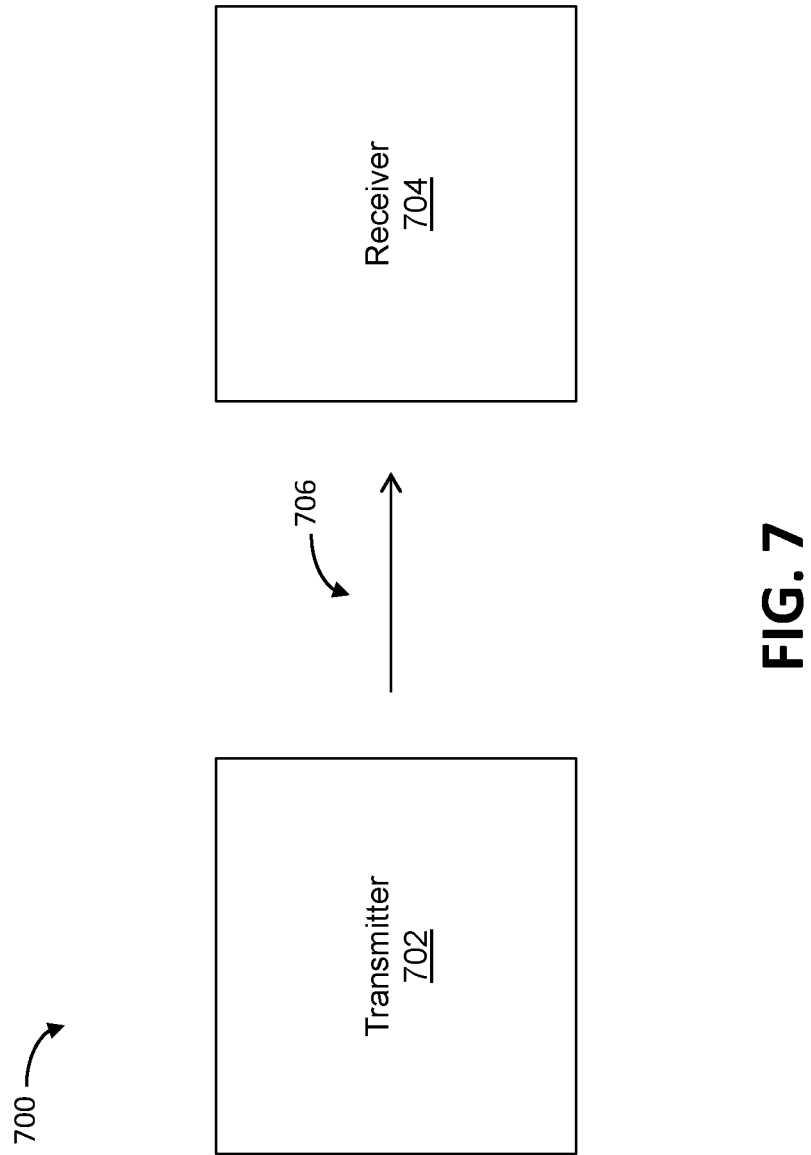
FIG. 7 is a block diagram a system having a transmitter and receiver configured for spread spectrum wireless power transfer in accordance with one example.

FIG. 7 depicts a system 700 for spread spectrum wireless power transfer. The system includes one or more transmitters 702 and one or more receivers 704. Each transmitter 702 may be or include the transmitter 100 of FIG. 1 and/or another transmitter configured for generation of a spread spectrum wireless power signal 706. Each receiver 704 may be or include one of the active or switched receivers described herein and/or another active or switched receiver configured to capture the spread spectrum wireless power signal 706. The configuration, arrangement, and other characteristics of each transmitter 702 and each receiver 704 may vary.

The spread spectrum wireless power signal 706 may include a code sequence or pattern as described herein. The sequence or pattern may include a series of half-sine or other waveforms separated from one another by zero voltage intervals. The waveform shape, the extent of the zero voltage intervals, and other aspects or characteristics of the spread spectrum wireless power signal 706 may vary. For instance, the spread spectrum wireless power signal 706 may or may not include data indicative of the code sequence or other pattern.

Figure 8:
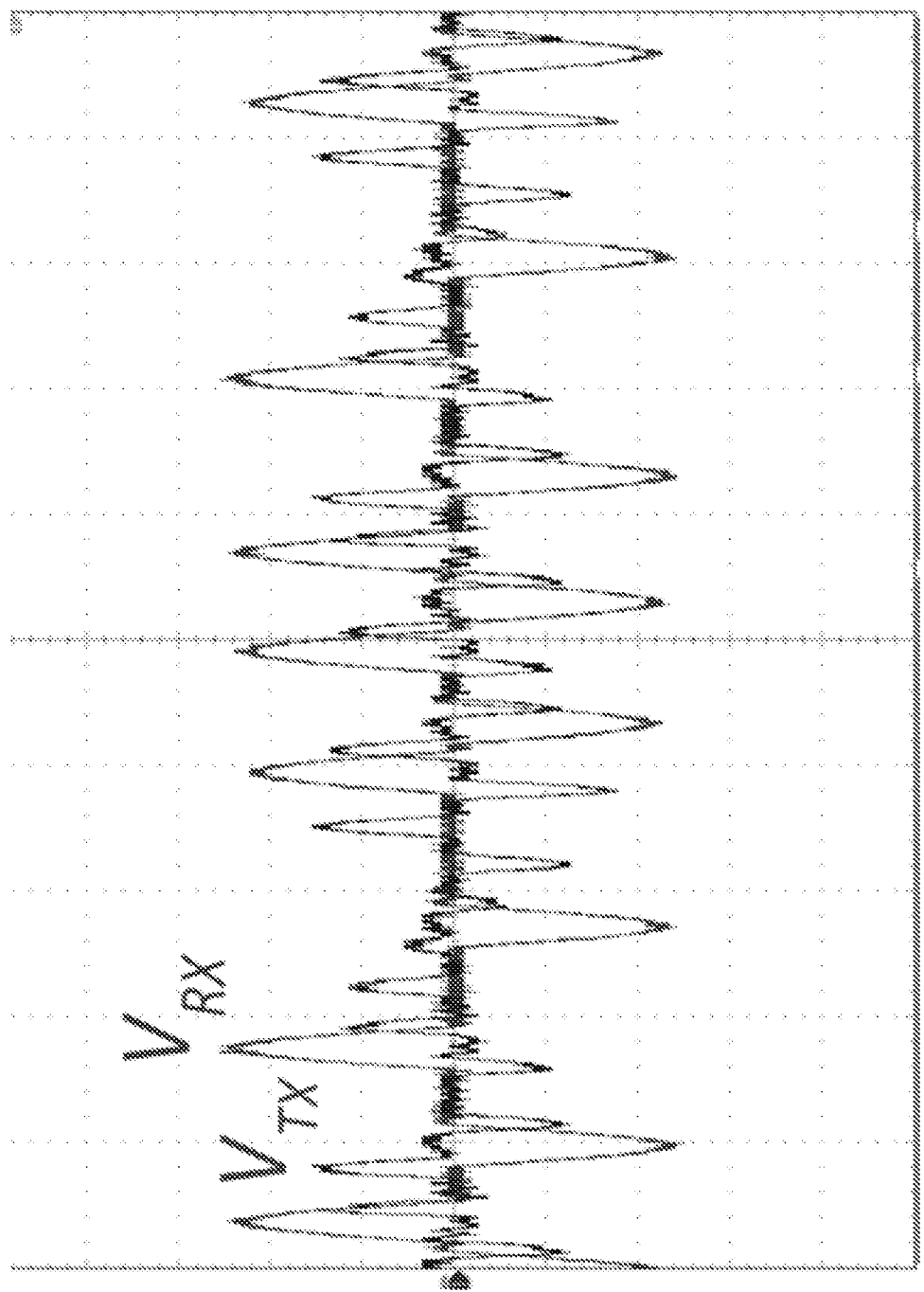
FIG. 8 is a plot of transmitter and receiver waveforms for wireless power transfer involving an example in which a quad-switch push-pull amplifier is used for the transmitter and a switched parallel resonant circuit with a half-bridge topology is used for the receiver.
Figure 9:
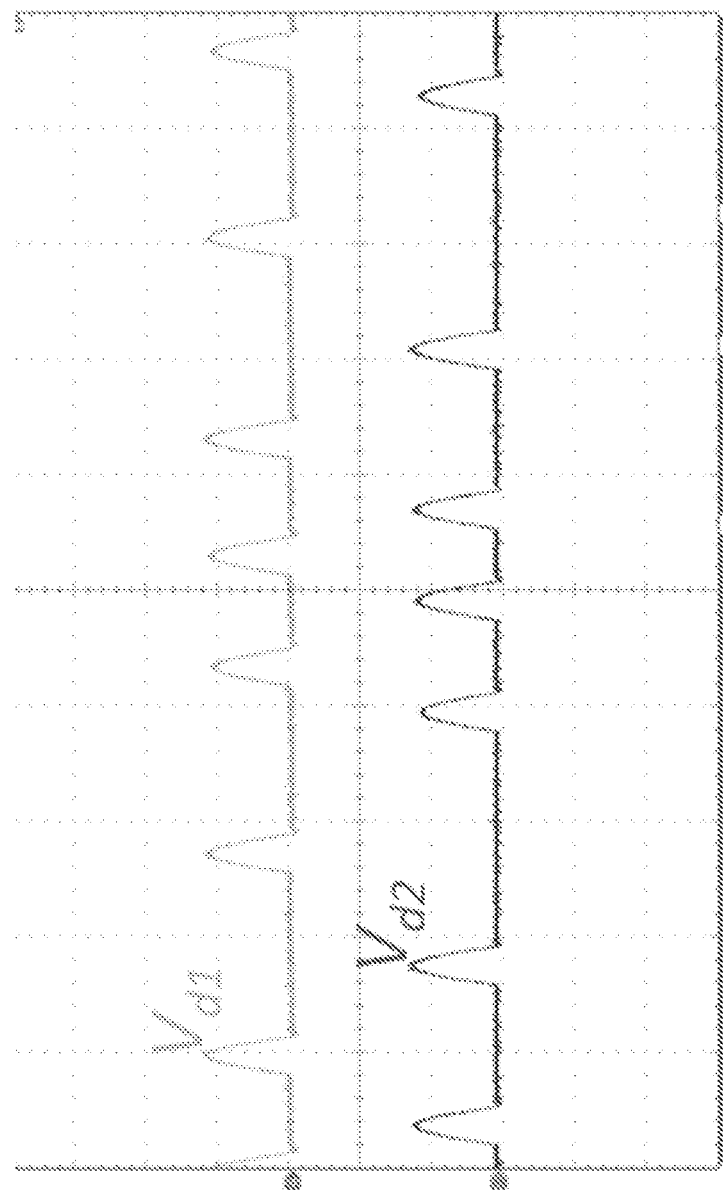
FIG. 9 are plots of receiver drain voltages for the example of FIG. 4.

FIGS. 8 and 9 show experimental results for direct sequence spread spectrum wireless power transfer (DSSS-WPT) using, for the transmitter, a Quad-Switch Push-Pull RF amplifier similar to that described above. For the experiment, the switching sequence for the transmitter was a randomly-selected portion of the sequence obtained from the genetic algorithm referenced herein. The primary and secondary coils for wireless power transfer inductors are printed circuit board (PCB) inductors with inductances of 4.88 µH and 1.88 µH, respectively. The receiver is a switched parallel resonant circuit with half bridge topology as described herein, with a 1 nF capacitor and switches realized by EPC2019 GaN field effect transistors (FETs). The receiver dynamics were modeled in MATLAB to obtain the switching pattern following the previously described optimization algorithm. The switching pattern is stored as a look-up table in ROM in a field programmable gate array (FPGA) controller (Xilinx Spartan-6), which is then used to control receiver switching.

The experimental results shown in FIGS. 8 and 9 very closely match the dynamics estimated in MATLAB, thereby providing a proof-of-principle implementation of a broadband receiver. The receiver trajectory is convergent to a steady state independent of the initial conditions, also making the receiver exponentially stable. The trajectory is robust to disturbances in the input signal. The transmitter output had been purposely under-damped for parasitic oscillations to illustrate the robustness of the receiver. The properties of robustness and convergence make it possible for the receiver to have operation without feedback. The receiver always exhibits zero voltage switching in the steady state when synchronized to the transmitter, ensuring that the switching losses are essentially zero.

FIG. 8 depicts the incoming spread spectrum signal $V_{TX}$ and the voltage $V_{RX}$ generated in the receiver 400 (FIG. 4). The voltage $V_{RX}$ depicted corresponds with the voltage $V_C$ across the resistor, capacitor, and inductor in that example receiver topology.

FIG. 9 depicts drain voltages for each of the two switches of the receiver 400 (FIG. 4). Each of the voltages are each of the switch voltages of using a GaN transistor and each of the voltages are referenced to ground.

The use of spread spectrum signals allows the wireless power transfer systems, transmitters, and receivers described herein to be well suited for multiple actor scenarios. For instance, the wireless power transfer may be single-input-multiple-output (SIMO), i.e., single transmitter and multiple receivers, multiple-input, single output (MISO), i.e., multiple transmitters and a single receiver, or multiple-input, multiple-output (MIMO), i.e., multiple transmitters and multiple receivers. To these ends, the spread spectrum signals may be configured in accordance with code division multiplexing. The controllers may then use such spread spectrum signals to implement multiple access wireless power transfer. The code division multiplexing provides an orthogonal approach to wireless power transfer. The orthogonality of the code division multiplexing allows multiple actors to operate simultaneously within the same frequency range, hence the reference to "multiple access" in so-called code division multiple access (CDMA) communications. The wireless power transfer techniques described herein may thus rely on spread spectrum techniques (e.g., direct-sequence spread spectrum modulation) to support multiple access, or multiple actor, scenarios.

Described herein are examples of wideband switched resonant receivers. A greedy optimization algorithm for receiving power using one of receiver topologies is presented and open-loop operation of this switched-resonant receiver is demonstrated thus proving the convergence of receiver dynamics to a steady-state trajectory, robustness to disturbances, and homogeneity to the transmitter input voltage. An end-to-end solution for direct-sequence spread-spectrum wireless power transfer is demonstrated by transferring about 2.1 W of power. The power output is much lower than the expected value of 9 W because of the poor power quality factor of the WPT inductor coils.

The topology of the switched receiver may vary from the examples described above. For instance, other push-pull topologies may be used, including topologies having ground referenced switches. Those and other topologies may be used to capture additional power from the transmitter spectrum.

The number of switches in the receiver may vary from the examples described above. For instance, a single switch topology may be used. In one example, the receiver has a boost converter topology.

Each controller of the disclosed receivers may include one or more processors, such as, a central processing unit (CPU). The controller may thus include multiple controllers or processors for respectively controlling, directing, or otherwise communicating with one or more of the above-described receiver components.

The processor of the controller may be a component in a variety of systems. The processor may be one or more general processors, digital signal processors, application specific integrated circuits, field programmable gate arrays, networks, digital circuits, analog circuits, combinations thereof, or other now known or later developed devices for analyzing and processing data. The processor may implement a software program, such as code generated manually (i.e., programmed).

Each controller may include a memory. The memory may communicate via a bus. The memory may be a main memory, a static memory, or a dynamic memory. The memory may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, and the like. In one case, the memory may include a cache or random access memory for the processor. Alternatively or additionally, the memory may be separate from the processor, such as a cache memory of a processor, the system memory, or other memory. The memory may be an external storage device or database for storing data. Examples may include a hard drive, memory card, memory stick, or any other device operative to store data. The memory may be operable to store instructions executable by the processor. The functions, acts or tasks illustrated in the figures or described herein may be performed by the programmed processor executing the instructions stored in the memory. The functions, acts or tasks may be independent of the particular type of instruction set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

Alternatively or additionally, dedicated hardware implementations, such as application specific integrated circuits, programmable logic arrays and other hardware devices, may be constructed to implement one or more of the control methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A receiver for wireless power transfer, the receiver comprising:
    a plurality of passive elements comprising a coupling element, the coupling element being configured to capture an incoming spread spectrum signal;
    an active switch coupled to the plurality of passive elements; and
    a controller to generate a control signal for the active switch;
    wherein the control signal changes a state of the active switch to vary a resonance condition established by the plurality of passive elements.

2. The receiver of claim 1, wherein:
    the plurality of passive elements comprise a capacitance and an inductance; and
    the capacitance, the inductance, or both the capacitance and the inductance, are parasitic.

3. The receiver of claim 1, wherein the coupling element is one of a plurality of coupling elements configured to capture the incoming spread spectrum signal.

4. The receiver of claim 1, wherein the controller comprises a memory in which a data indicative of a switching pattern for the control signal is stored.

5. The receiver of claim 4, wherein the controller further comprises a clock in communication with the memory such that the switching pattern is clocked out of the memory by a clock signal provided by the clock.

6. The receiver of claim 1, wherein the controller is configured to receive pattern data and to determine a switching pattern based on the pattern data.

7. The receiver of claim 1, wherein the controller is configured to react to the incoming spread spectrum signal to determine a switch pattern for the control signal.

8. The receiver of claim 1, wherein:
    the active switch is one of a plurality of active switches coupled to the plurality of passive elements; and
    the plurality of active switches are arranged in a full-bridge topology.

9. The receiver of claim 1, wherein:
    the active switch is one of a plurality of active switches coupled to the plurality of passive elements; and
    the plurality of active switches are arranged in a half-bridge topology.

10. The receiver of claim 1, wherein:
    the active switch is one of a plurality of active switches coupled to the plurality of passive elements; and
    the plurality of active switches are arranged in a push-pull topology.

11. The receiver of claim 1, wherein the active switch is gated by a ground-referenced waveform.

12. The receiver of claim 1, wherein the plurality of passive elements are arranged for zero voltage switching.

13. The receiver of claim 1, wherein the plurality of passive elements are arranged for zero current switching.

14. The receiver of claim 1, wherein the plurality of passive elements and the active switch are coupled to one another for piecewise resonance.

15. The receiver of claim 1, wherein the incoming spread spectrum signal is non-alternating, and the control signal changes the state of the active switch such that the receiver exhibits an alternating voltage.

16. The receiver of claim 1, wherein the incoming spread spectrum signal is non-alternating, and the control signal changes the state of the active switch such that the receiver exhibits a non-alternating voltage.

17. The receiver of claim 1, wherein the controller is configured to implement multiple access wireless power transfer.

18. The receiver of claim 1, wherein the incoming spread spectrum signal is configured in accordance with code division multiplexing for the wireless power transfer.

19. A method for wireless power transfer, the method comprising:
    obtaining, by a controller of a receiver, pattern data for an incoming spread spectrum signal;
    determining, by the controller of the receiver, a pattern for the incoming spread spectrum signal based on the obtained pattern data;
    detecting a polarity of a voltage in the receiver; and
    generating switch control signals for a plurality of switches of the receiver in accordance with the determined pattern and the detected voltage such that the plurality of switches vary a resonance condition of the receiver.

20. The method of claim 19, wherein obtaining the pattern data comprises analyzing, by the controller of the receiver, the incoming spread spectrum signal to detect a polarity and timing of a waveform of the incoming spread spectrum signal.

21. A system for wireless power transfer, the system comprising:
    a transmitter configured to generate a spread spectrum signal; and
    a receiver configured to receive the spread spectrum signal, the receiver comprising:

a plurality of passive elements comprising a coupling element, the coupling element being configured to capture the incoming spread spectrum signal;
an active switch coupled to the plurality of passive elements; and
a controller to generate a control signal for the active switch;
wherein the control signal changes a state of the active switch to vary a resonance condition established by the plurality of passive elements.

22. The system of claim 21, wherein the spread spectrum signal is configured in accordance with code division multiplexing for the wireless power transfer.

23. The system of claim 21, wherein the coupling element is one of a plurality of coupling elements configured to capture the incoming spread spectrum signal.

\* \* \* \* \*